Sept. 29, 1936.   F. S. STICKNEY   2,055,990
INSTRUMENT CASING
Filed Jan. 31, 1935
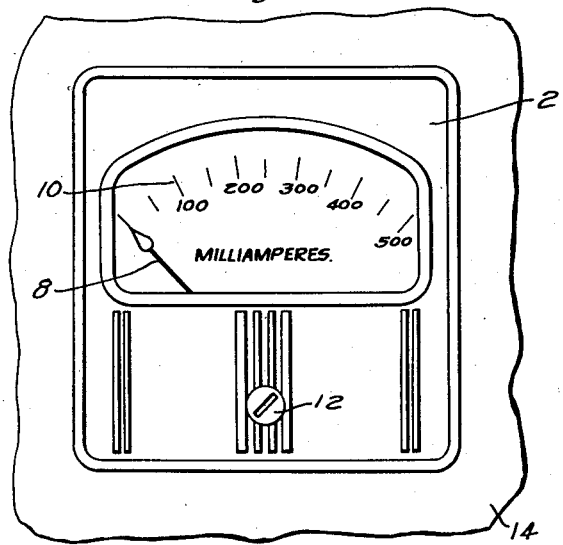
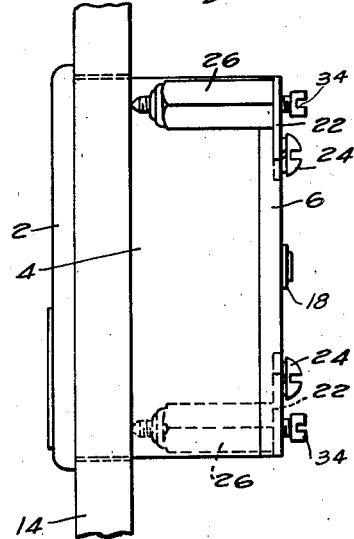
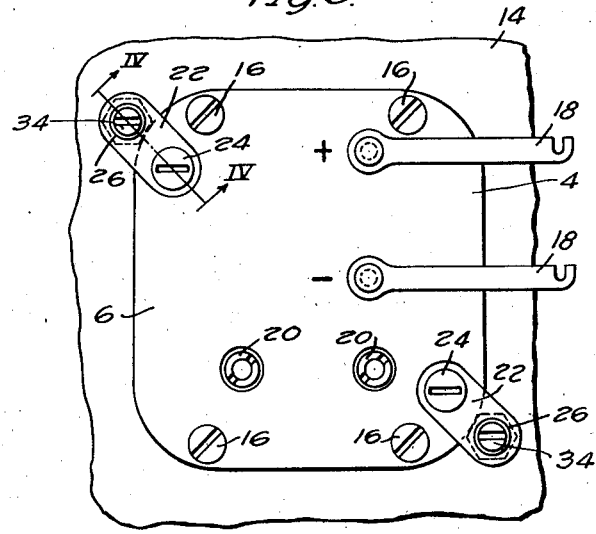
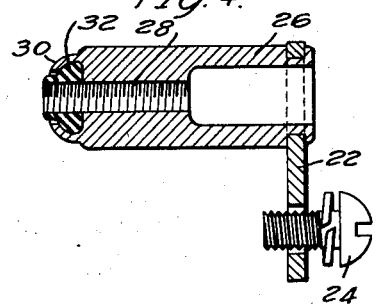
WITNESSES:
E.G. McCloskey
Wm. C. Frome
INVENTOR
Fernald S. Stickney.
BY
ATTORNEY Patented Sept. 29, 1936

2,055,990

UNITED STATES PATENT OFFICE 2,055,990

INSTRUMENT CASING

Fernald S. Stickney, Nutley, N. J., assignor to Westinghouse Electric & Manufacturing Company, East Pittsburgh, Pa., a corporation of Pennsylvania Application January 31, 1935, Serial No. 4,417

3 Claims. (Cl. 248—27)

The invention relates to measuring instruments, and more particularly to an improved construction for an electrical indicating instrument particularly adapted for mounting on a switchboard or other type of panel.

Electrical indicating instruments are usually mounted on a panel or the like by means of screws extending through the peripheral flange on the face of the instrument into engagement with the panel. Such expedient, in addition to being unsightly, does not provide an ideal mounting because all of the supporting action is taken care of by the relatively thin flange on the face of the instrument. In accordance with present practice, electrical instruments are designed to have as pleasing an appearance as possible, without sacrificing their utility, and at the same time, if they are to be mounted on a switchboard or panel in a location subjected to vibration, it is essential that the mounting means be so devised that the influence of such vibration will not loosen the mounting.

It is an object of the present invention, therefore, to provide an instrument mounting whereby no securing screws are visible from the face of the instrument and whereby the mounting will not be disturbed by reason of shock, vibration or similar disturbances.

Other objects of the invention will be apparent from the following description when read in conjunction with the accompanying drawing, wherein:

Figure 1 is a view in front elevation of an instrument casing mounted in accordance with the present invention;

Fig. 2 is a view in side elevation of the structure shown in Fig. 1;

Fig. 3 is a view, in elevation, of the rear face of the instrument shown in Figs. 1 and 2;

Fig. 4 is an enlarged view in section of a clamping device utilized in accordance with the present invention taken along the line IV—IV of Fig. 3; and Fig. 5 is a view of the clamping bolt which cooperates with the device shown in Fig. 4.

Referring more particularly to the drawing, the instrument casing, in accordance with the present invention, comprises a front panel 2 suitably secured to a body portion 4, and having a rear closure plate 6. The casing is adapted, in the present embodiment, to enclose an electrical indicating instrument movement (not shown) for deflecting a pointer 8 over a scale 10. In accordance with usual practice, a calibrating screw 12 is accessible from the face of the instrument for adjusting the zero position of the pointer 8.

The instrument is adapted to be mounted on a panel 14, which may be a portion of the switchboard. It will be noted that the aperture in the panel through which the instrument extends is approximately of the same shape and size as the body portion 4 of the instrument. The face plate 2, however, is somewhat larger than said aperture to prevent the instrument from passing through the aperture to the right, as shown in Fig. 2.

Referring to Fig. 3, the rear closure plate 6 may be secured to the body portion 4 by means of suitable screws 16 and is provided with strap terminals 18 electrically connected to the operating winding of the instrument movement. The movement itself is carried by the plate 6 and is secured thereto by bolts 20 having the heads thereof countersunk in the plate 6.

The strap terminals 18 are each provided with a notch adjacent the free end thereof so that a conductor may be wrapped around the strap and then soldered in place.

The rear plate 6 is provided at diagonally opposite points with brackets 22 secured to the plate 6 by screws 24. The free end of each bracket 22 supports a tubular bushing 26, which extends parallel to the surface of the body portion 4 toward the supporting panel 14. As shown, referring to Fig. 4, one end of each bushing is of a reduced diameter, to permit its extension through an aperture in the respective bracket 22, and may then be spun or otherwise deformed to make a rigid connection with the bracket 22, which itself is of heavy metal.

Each bushing 26 is provided with an enlarged bore at the end adjacent to bracket 22 and a threaded bore 28 of smaller diameter toward the other end. The free end of the bushing is provided with a relatively thin peripheral portion 30 which is adapted to retain in position a block 32 of fibrous material. A bolt 34 threaded to correspond to the threaded portion 28 of the bushing bore is to be inserted into the bushing from the right, as shown in Fig. 4, and threaded through the block of material 32. It is contemplated that the block 32 will be provided originally with a hole of less diameter than the threaded portion 28 so that screw 34 will cut its threads through the block 32, and, as shown in Fig. 2, will extend beyond the bushing into engagement with the supporting panel 14. As shown in Fig. 2, the bushing may be hexagonal in cross-section, but the shape is not material.

With the structure described, it should be apparent that by tightening down on the screws 34, an efficient clamping action may be obtained which rigidly clamps the panel 14 between the flange on the face of the instrument and the ends of the bolts 34. The fibrous material 32 is resilient and constitutes, in effect, an elastic locknut, and avoids the inconvenience of metallic lock-nuts of usual design. The bushing 26 and the bracket 22 are of relatively heavy inflexible material, and when the structure is secured to the back plate 6 of the instrument, a rigid bracket structure results. By reason of the fact that the threaded portion 28 of the bushing is relatively close to the supporting panel 14, an efficient clamping action is obtained.

Although the invention has been described with reference to an indicating milliammeter, it obviously may also be applied to other types of instruments and meters, or, in fact, any encased instrumentality which it is desired to mount on a panel.

I claim as my invention:

1. A casing for a measuring instrument having a body portion proportioned to extend through an opening in a support, a face portion on said body proportioned to cover said opening and be substantially flush with the support when the instrument is in operative position, brackets secured to the rear face of the instrument and projecting laterally from the body portion, elongated bushings secured to said brackets and projecting at right angles with respect thereto toward said support, an aperture in the free end of each bracket in axial alignment with the bore of said bushing, and a threaded bolt for extension through said aperture and bore, said bore being interiorly threaded at the end adjacent to said support for receiving said bolt.

2. A casing for a measuring instrument having a body portion proportioned to extend through an opening in a support, a face portion on said body proportioned to cover said opening and be substantially flush with the support when the instrument is in operative position, brackets secured to the rear face of the instrument and projecting laterally from the body portion, elongated bushings secured to said brackets and projecting at right angles with respect thereto toward said support, an aperture in the free end of each bracket in axial alignment with the bore of said bushing, a threaded bolt for extension through said aperture and bore, said bore being interiorly threaded at the end adjacent to said support for receiving said bolt and of an enlarged diameter adjacent to said bracket for receiving the head of said bolt.

3. A casing for a measuring instrument having a body portion proportioned to extend through an opening in a support, a face portion on said body proportioned to cover said opening and be substantially flush with the support when the instrument is in operative position, brackets secured to the rear face of the instrument and projecting laterally from the body portion, elongated bushings secured to said brackets and projecting at right angles with respect thereto toward said support, an aperture in the free end of each bracket in axial alignment with the bore of said bushing, a threaded bolt for extension through said aperture and bore, said bore being interiorly threaded at the end adjacent to said support for receiving said bolt and embodying means for exerting a binding force on said bolt.

FERNALD S. STICKNEY.